No. 609,970.　　　　　　　　　　　　　　　　Patented Aug. 30, 1898.
P. LOCHMANN.
APPARATUS FOR KEEPING AND SENDING LIQUID MATERIALS.
(Application filed Aug. 6, 1896.)
(No Model.)　　　　　　　　　　　　　　　　　　　　　　　　4 Sheets—Sheet 1.
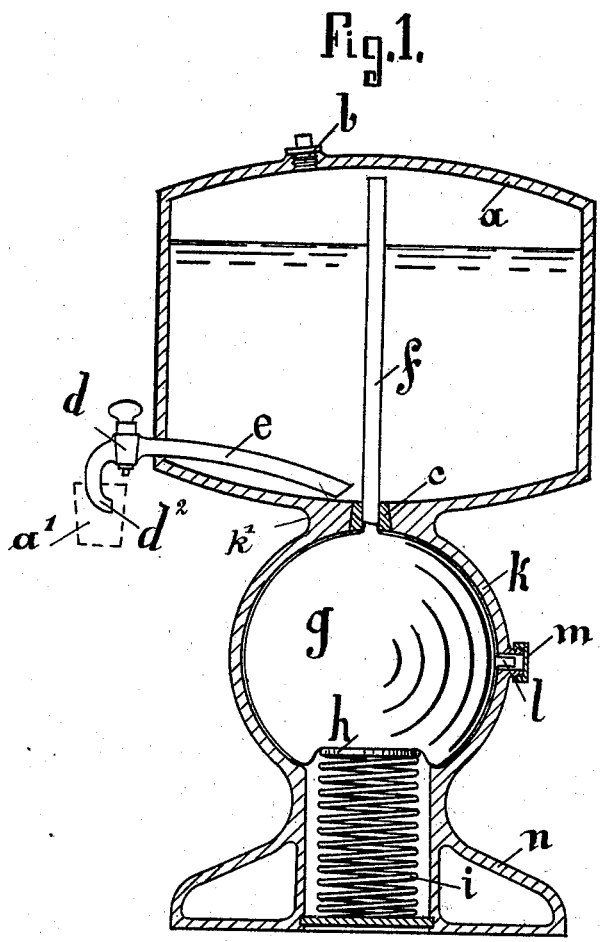
WITNESSES:　　　　　　　　　　　　　　　　　　　　　INVENTOR
　　　　　　　　　　　　　　　　　　　　　　　　　　　Paul Lochmann
　　　　　　　　　　　　　　　　　　　　　　　　　BY
　　　　　　　　　　　　　　　　　　　　　　　　　　　ATTORNEYS.

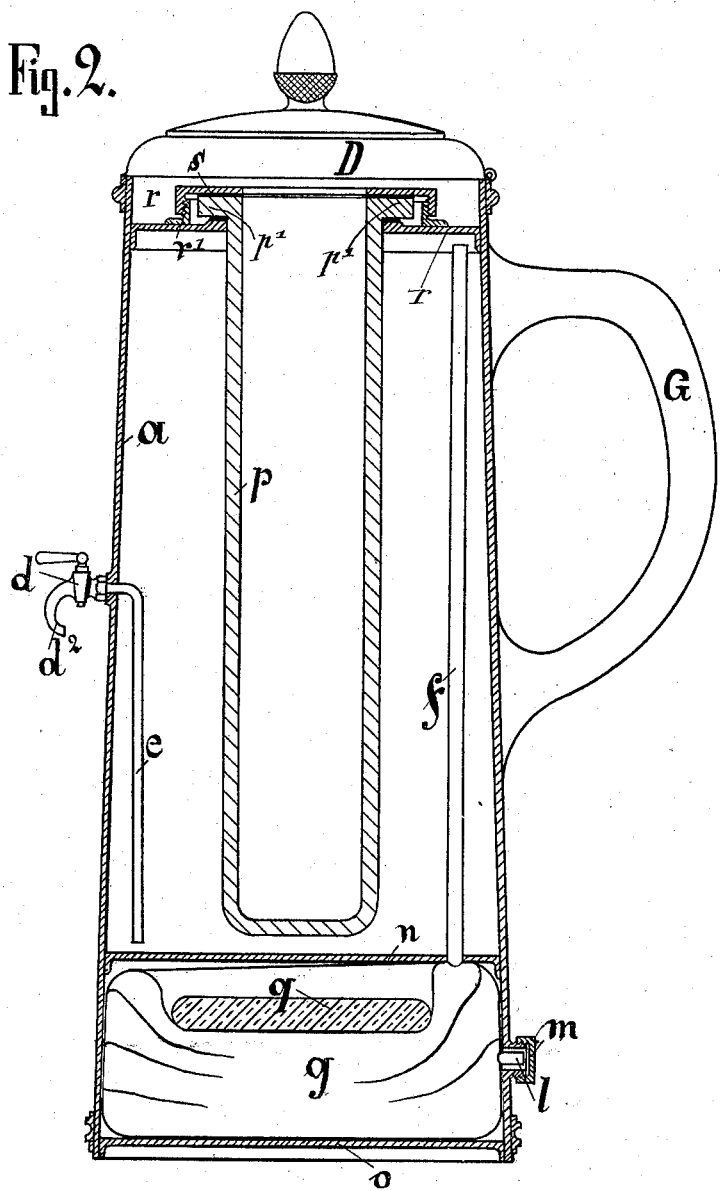

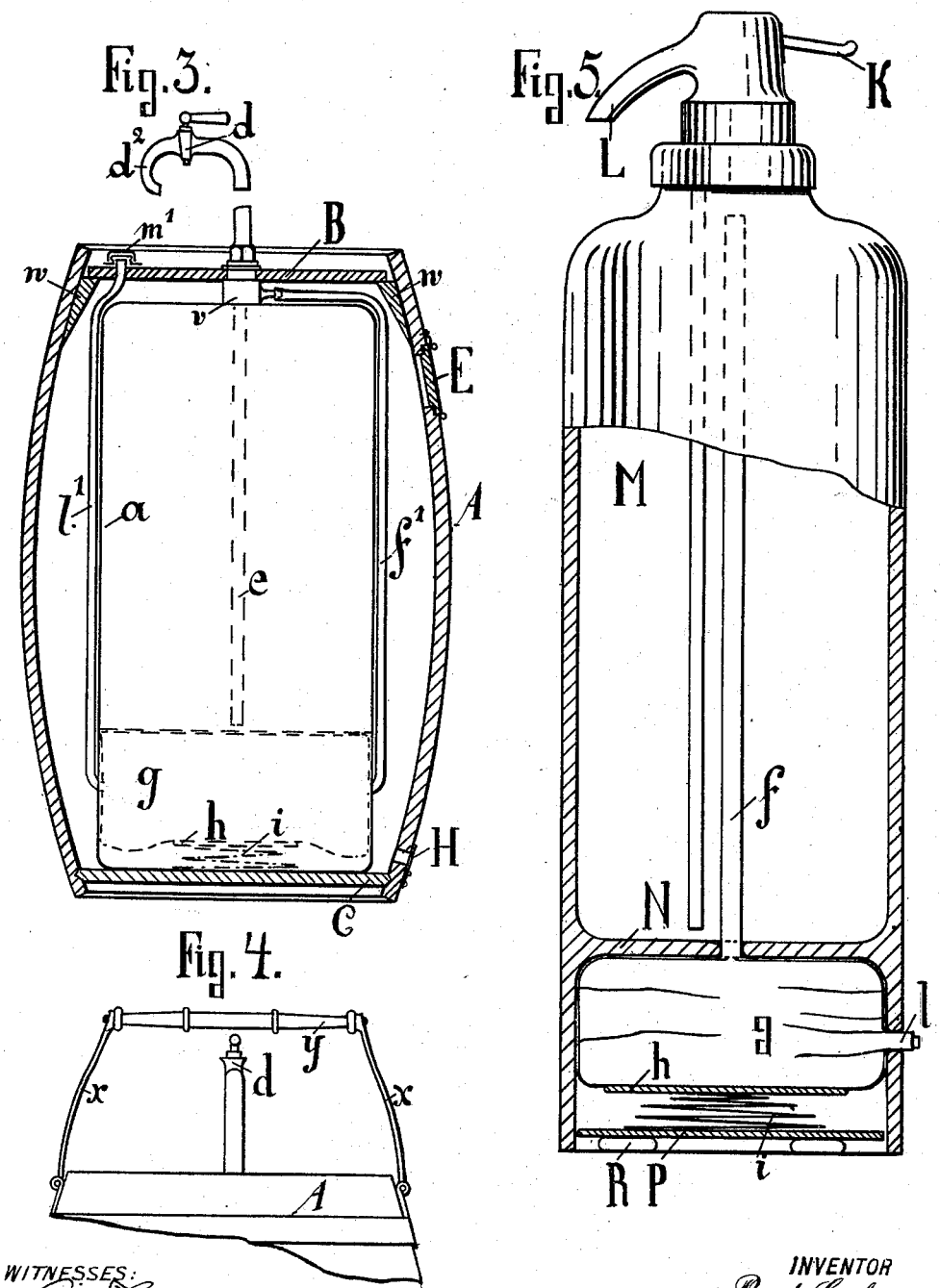

No. 609,970. Patented Aug. 30, 1898.
P. LOCHMANN.
APPARATUS FOR KEEPING AND SENDING LIQUID MATERIALS.
(Application filed Aug. 6, 1896.)
(No Model.) 4 Sheets—Sheet 4.
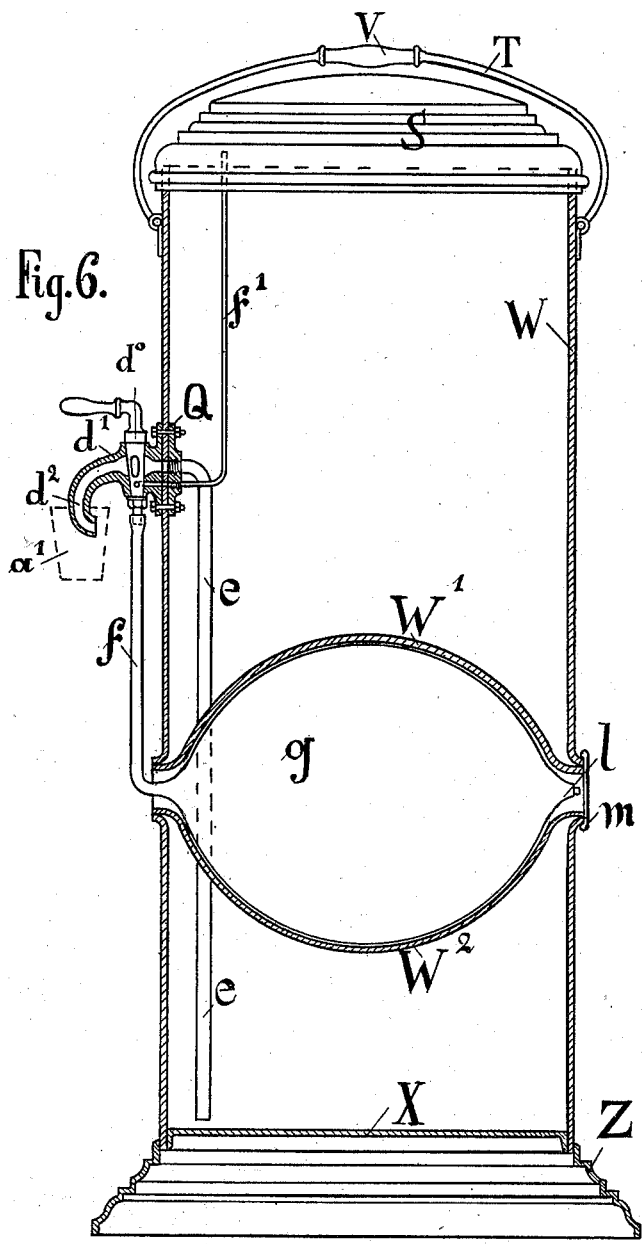

UNITED STATES PATENT OFFICE.

PAUL LOCHMANN, OF LEIPSIC-GOHLIS, GERMANY.

APPARATUS FOR KEEPING AND SENDING LIQUID MATERIALS.

SPECIFICATION forming part of Letters Patent No. 609,970, dated August 30, 1898.

Application filed August 6, 1896. Serial No. 601,872. (No model.)

*To all whom it may concern:*

Be it known that I, PAUL LOCHMANN, a subject of the King of Saxony, residing at Leipsic-Gohlis, Saxony, Germany, have made new and useful Improvements in Apparatus for Keeping and Sending Liquid Materials, of which the following is a full and clear specification.

This invention relates to an apparatus in which liquids of all sorts, particularly carbonated liquids, such as beer, can be kept and preserved for a greater period of time than heretofore. A cooling device is embodied in the apparatus for the purpose of cooling off and keeping the liquid at a constant cooling temperature.

My invention consists of an apparatus for preserving liquids, comprising a vessel containing the carbonated liquid, an elastic receiver for the carbonic-acid or other gas, which has communication with the interior of the vessel, said receiver being confined within limiting-walls, against which the elastic walls of the receiver are pressed, there being combined with the receiver a spring, weight, or the equivalent for the purpose of producing extra pressure on the receiver when the elasticity of its walls is insufficient for driving out at proper pressure the gas within the same; and the invention consists, further, in combination, with said parts, of a cooling vessel which is inserted into the liquid-containing vessel, whereby the liquid is kept cool, and the invention consists, finally, of features of construction and details to be described hereinafter and then particularly claimed.

In the accompanying drawings, Figure 1 represents a longitudinal vertical section of my preferred form of apparatus for preserving and transporting liquids, such as beer, seltzer-water, soda-water, and corbonated beverages generally. Fig. 2 is a longitudinal vertical section of a jug embodying my invention, the same being provided with a double bottom and a hermetically-closed porous earthenware or the equivalent ice-containing vessel or cylinder to act as a cooling agent. Fig. 3 is a longitudinal vertical section of another form of my apparatus, showing the same placed within a cask. Fig. 4 is a detail side elevation of the upper part of the last-mentioned apparatus. Fig. 5 is a side elevation, partly in longitudinal vertical section, of a siphon embodying my invention; and Fig. 6 is a vertical longitudinal section of a further modification of my apparatus for preserving liquids in which no cooling device is shown and in which the carbonic-acid or other gas is conducted from the receiver containing the same into the spigot of the cock, from whence it is conducted into the upper part of the liquid-containing vessel.

Similar letters of reference indicate corresponding parts.

In all the forms of my invention the principle of the internal construction of the apparatus and the operation of the same always remain the same, and in order to create the pressure necessary for forcing the carbonic-acid gas from the gas-receiver into the liquid-containing vessel there are provided elastic gas-receivers, which, in addition to their own elasticity, brought about by the inflation of the same by the gas, are further operated upon by some pressure, such as of a spring or weight. The said gas-receiver may be directly arranged in and connected with the liquid-containing vessel or it may be detachably connected with the same, in which latter case a coupling which can be readily attached and detached is used.

In the form of the invention shown in Fig. 1 the liquid-containing vessel $a$, which has here the form of a cask, or it may have any other suitable shape, is rigidly connected with and supported upon a spherical chamber $k$ by means of a neck $k'$, said chamber $k$ serving for the reception of the receiver $g$, which contains the carbonic-acid or other gas. To balance and support the described parts, the chamber $k$ is formed with an enlarged base $n$. The vessel $a$ is provided at the top with a bung-hole, closed by a bung or plug $b$, and is at the bottom provided with a cock $d$, having an inwardly-extending pipe $e$, that terminates at about the mid-length of the cask. This cock $d$ has a peculiarly-curved nozzle $d^2$, which is of falciform—that is to say, it is bent like a sickle—so that the end opening of the nozzle will extend in a lateral direction with respect to the vertical portion of the same, whereby the carbonated liquid in the vessel $a$ is discharged sidewise against the walls of the glass or mug $a'$, which is placed under the cock, whereby the strong foaming of the issuing liquid is prevented. By this means an easy discharge of the liquid is made possible, even when there is a high degree of pressure of the carbonic-acid gas in the vessel $a$.

A vertical tube $f$, which is in direct connection with the gas-receiver $g$, extends through the neck $k'$ upwardly into the vessel $a$ and terminates short of the top thereof, so as to permit the gas to escape into the vessel. The tight fit of the tube $f$ within the neck $k'$ is accomplished by packing the same by means of a bushing $c$. When the elastic carbonic-acid-gas receiver $g$ is inflated, it is in the form of a ball and fits tightly against the walls of the spherical chamber $k$, so as to perfectly fill the same.

A small nipple $l$ projects from the elastic receiver or bulb $g$ and serves for the charging of gas into the receiver through a screw-threaded neck on the chamber $k$, the same being closed by means of a screw-threaded cap $m$, screwed onto the said neck.

A helical spring $i$, arranged within the base $n$, is provided at its upper end with a follower $h$, which is pressed by said spring against the elastic body of the receptacle $g$ in order to supply additional pressure for the gas within the receiver and force the same through the tube $f$ into the liquid-containing vessel $a$.

In Fig. 2 the elastic gas-receiver $g$ is also employed, the same being arranged between the double bottoms $n$ $o$ of the vessel $a$, which is here shown in the shape of a jug or the like. The lower portion of the jug, which is contained between the bottoms $n$ $o$, corresponds with the chamber $k$, (shown in Fig. 1,) while the upper portion of the jug, above the bottoms $n$ $o$, provides a liquid-containing vessel. Fitting tightly or screwed permanently to the upper part of the vessel $a$, here shown, is a diaphragm $r$, having an enlarged central opening which receives a cooling device $p$, that is supported by its flange $p'$ on said diaphragm and extends below the same nearly to the lower end of the vessel $a$. This cooling device $p$ is in the form of a cylinder, closed at its lower end, and may be made of earthenware or the like. The affixing of the cylindrical cooling device to the partition $r$ is accomplished through the medium of a retaining-ring $s$, which is screw-threaded and is screwed onto a screw-threaded neck $r'$, which projects upwardly from the said diaphragm $r$.

The cock $d$, the nozzle $d^2$, and the pipe $e$ are the same as shown in Fig. 1, excepting that the pipe $e$ extends vertically. In this case the filling of the vessel $a$ takes place through the opening in the diaphragm $r$ through which the cylindrical cooling device extends, this latter having of course to be removed after removing the retaining-ring. The hinged lid D and the handle G give to the exterior of the described device an attractive appearance, causing it to look like a jug or mug. The extra pressure required for the elastic receiver $g$ is furnished by means of a weight $q$, which rests upon the top of the receiver, so that the proper supply of gas is led through the tube $f$. The nipple $l$ and the closing-cap $m$ are the same as in the form of device formerly described.

In Fig. 3 the apparatus partakes of the exterior form of a cask, this cask A serving merely as a casing for the vessel $a$, in which the carbonated liquid is contained. In this form of the invention the elastic carbonic-acid-gas receiver $g$ (see dotted lines) is acted upon by means of a spiral spring $i$, that presses a follower-plate $h$ against the bottom of the gas-receiver, as in the form shown in Fig. 1. The liquid-containing vessel $a$, which is hermetically closed in this instance, receives its supply of carbonic-acid gas through the medium of an exterior tube $f'$, extending from the receiver $g$ to a stuffing-box or hollow neck $v$, arranged coincident with the longitudinal axis of the vessel $a$. The stuffing-box $v$ also serves as a support for the cock $d$ and its pipe $e$, the relative dimensions of the stuffing-box or neck $b$ and of the pipe $e$ being such that a space is left between the two. The casing A for the vessel $a$, while it is here shown as consisting of a cask-like body $a$, having a bottom C and a lid B, may be in any other suitable form which prevents ready access to the interior of the vessel $a$. The lid B rests upon the shoulder $w$, formed at the upper part of the cask $a$, and may be secured thereto in any suitable manner whereby a safe closing of the cask is obtained.

$l'$ is a filling-tube leading to the gas-receiver, the same extending through the lid B and its projecting end being protected by a cap $m'$. The space between the cask or exterior covering A and the interior vessel $a$ is for the purpose of receiving cracked ice or other suitable refrigerating material, which is introduced through an opening closed by a hinged flap E, arranged at the upper part of the cask A, the opening which is closed by the flap H, arranged at the bottom of the cask, serving for the purpose of discharging the water caused by the melting of the ice. A bail, consisting of handle $y$ and hinged arms $x$, is arranged at the upper part of the cask, which, when extended, as shown in Fig. 5, over the cock $d$, protects the same.

In Fig. 5 an elastic receiver $g$, follower $h$, and spring $i$, which correspond to the same parts shown in Fig. 3, are shown; but in this form of the invention the same, as shown, is adapted to a siphon M. The siphon M is of the usual form, it being provided with a nozzle L and a valve-lever K; but the bottom N of the siphon or vessel is so raised as to form, below the same, a chamber, in which the elastic receiver $g$ can be arranged. The nipple $l$ of the receiver $g$, which projects through the side of the siphon or vessel M, is shown as closed by a plug. The spring $i$, which actuates the follower $h$, is here shown as raised and is supported by a false bottom P, which rests upon the inwardly-projecting lugs R, said false bottom P confining the spring, the follower, and the elastic receiver in the hollow at the lower part of the siphon. The gas-supply tube $f$ extends from the elastic receiver $g$, through an opening in the elevated bottom N, into the liquid-chamber in the upper part of the siphon.

In Fig. 6 the liquid-containing vessel W is shown as provided with a bottom X, a surrounding bottom flange or base Z, a lid S, and a bail T, provided with a handle V. The gas-receiver $g$ is arranged so that it fits tightly within a spherical or other suitably-shaped chamber $W'$ $W^2$, arranged at the lower part of the vessel W. One end of the receiver $g$ is provided with a nipple $l$, closed by a suitable plug, and which extends through a neck of the chamber $W'$ $W^2$, opening out through the side of the vessel W, where the same is closed by means of a suitable closure $m$. The gas-supply tube $f$ in this instance leads from the opposite end of the receiver $g$ through the corresponding open neck of the chamber $W'$ $W^2$ and is screwed onto the lower end of the plug $d^0$ of the cock $d'$, which plug is, at its lower part, provided with an opening which, when the plug is turned, establishes a communication between the flexible gas-supply pipe $f$ and the auxiliary pipe $f'$, arranged inside of the vessel W and leading upwardly from an opening in the base or flange Q, which supports the cock $d'$. The carbonic-acid gas will enter the vessel through the auxiliary tube $f'$, while the liquid will pass out of the vessel through the pipe $e$ and the cock $d'$ in the usual manner.

The carbonic-acid-gas receiver $g$ is made of soft rubber or other elastic material, which when inflated is expanded against the walls of the chamber in which it is arranged, whereby a firm and tight contact of the receiver with the walls of the chamber is obtained, so that the liquid is held under pressure without danger of bursting the receiver. In discharging the liquid from the vessel the inherent elasticity of the receiver or bulb itself mainly causes, while the spring or weight furthers, the pressing action. In this way a supply of carbonic-acid gas corresponding to the discharged liquid is obtained, so that a fairly even pressure of gas is secured in the liquid-containing vessel until the latter is completely emptied. Only a small volume of carbonic-acid gas is left in the receiver $g$ when the liquid-containing vessel has been emptied, which goes to show that an exceedingly economical consumption of gas takes place. Instead of carbonic-acid gas compressed air or any other suitable gas may be used. It is also evident that besides the various combinations and modifications here described and shown other combinations with the elastic carbonic-acid-gas receiver can be made.

Having thus described my invention, I claim as new and desire to secure by Letters Patent—

1. In an apparatus for preserving and transporting liquids, a liquid-containing vessel and an elastic gas-receiver inflated within and tightly against the walls of a chamber attached to the vessel and having communication with the liquid-containing space of the vessel, substantially as set forth.

2. In an apparatus for transporting liquids, a liquid-containing vessel provided with a closed chamber, an elastic gas-receiver arranged within the chamber and fitting, when inflated, tightly against the walls of the chamber, and a pressure device acting on the walls of the elastic receiver said receiver having communication with the liquid-containing space of the vessel, substantially as set forth.

In testimony whereof I have signed my name to this specification in the presence of two subscribing witnesses.

PAUL LOCHMANN.

Witnesses:
OTTO ROESLER,
RUDOLPH FRICKE.